Aug. 8, 1961 H. C. A. VAN DUUREN ET AL 2,995,618
SYSTEM FOR TRANSMITTING TELEGRAPH SIGNALS
BY SINGLE SIDE-BAND WITH OR WITHOUT
CARRIER SUPPRESSION
Filed April 5, 1957 5 Sheets-Sheet 1

INVENTORS
HENDRIK C. A. VAN DUUREN
AND CHRISTIAAN J. VAN DALEN
BY
Hugh A. Kirk

INVENTORS
HENDRIK C. A. VAN DUUREN
AND CHRISTIAAN J. VAN DALEN
BY
Hugh A. Kirk

TRANSMITTER

RECEIVER

INVENTORS
HENDRIK C. A. VAN DUUREN
AND CHRISTIAAN J. VAN DALEN
BY Hugh A. Kirk
ATT'Y.

Aug. 8, 1961 H. C. A. VAN DUUREN ET AL 2,995,618

SYSTEM FOR TRANSMITTING TELEGRAPH SIGNALS BY SINGLE SIDE-BAND WITH OR WITHOUT CARRIER SUPPRESSION

Filed April 5, 1957 5 Sheets-Sheet 4

INVENTORS
HENDRIK C. A. VAN DUUREN
AND CHRISTIAAN J. VAN DALEN
BY
Hugh A. Kirk

Aug. 8, 1961 H. C. A. VAN DUUREN ET AL 2,995,618

SYSTEM FOR TRANSMITTING TELEGRAPH SIGNALS BY SINGLE SIDE-BAND WITH OR WITHOUT CARRIER SUPPRESSION

Filed April 5, 1957 5 Sheets-Sheet 5

INVENTORS
HENDRIK C. A. VAN DUUREN
AND CHRISTIAAN J. VAN DALEN

United States Patent Office 2,995,618

Patented Aug. 8, 1961

2,995,618

SYSTEM FOR TRANSMITTING TELEGRAPH SIGNALS BY SINGLE SIDE-BAND WITH OR WITHOUT CARRIER SUPPRESSION

Hendrik Cornelis Anthony van Duuren, Wassenaar, and Christiaan Johannes van Dalen, Leidschendam, Netherlands, assignors to De Staat der Nederlanden, Ten Deze Vertegenwoordigd Door de Directeur-Generaal der Posterijen, Telegrafie en Telefonie, The Hague, Netherlands Filed Apr. 5, 1957, Ser. No. 651,035

17 Claims. (Cl. 178—2)

This invention relates to a system for transmitting telegraph signals by single side-band with or without carrier suppression. Single side-band telephone systems have been known for a considerable time and the advantage of such systems have also been known.

The present invention aims at the provision of a system by which telegraph transmission can also be effected by a single side-band transmission.

In the single side-band transmission of coded information it is necessary that the wave-form of the coded signals to be transmitted should have no D.C. (direct current) component—since the D.C. component would be lost in the filters necessary in the system. A wave-form having no D.C. component is regarded as a "pure" alternating current and the word "pure" is meant to indicate that the area enclosed by the curve above its X-axis is equal to the area enclosed beneath the X-axis. Such a wave-form is symmetrical with respect to the X-axis and in the following description is referred to as a balanced wave-form.

Telegraph signals in known codes are generally not symmetrical though it has been proposed to transmit each element of a signal twice, with inversion the second time. Such a procedure will result in a balanced signal but it has not been appreciated that a balanced signal of this nature could be used to modulate a carrier-frequency. Moreover, it results in a slowing up of transmission.

An unbalanced code may be converted to a balanced code, either (1) by transforming every code combination into a signal of symmetrical wave-form or (2) by transforming every element of a signal into a symmetrical wave-form.

According to this invention a telegraph system in which telegraph signals are transmitted over a route which incorporates a carrier-frequency link is characterised in that said signals are converted into balanced signals (as defined), said balanced signals being utilised to modulate a carrier frequency, and is further characterized in that a single side-band of the modulated carrier either with or without carrier suppression is utilised for transmission.

The invention is illustrated in the accompanying drawings in which.

Figure 4:
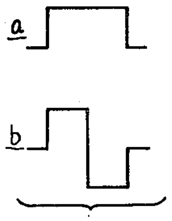
Figure 5:
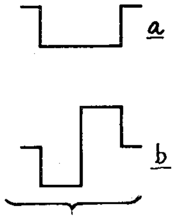
Figure 6:
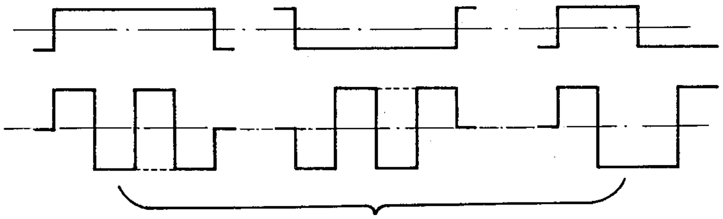

FIG. 4*a* is a curve (*a* in FIG. 4) illustrating a mark and FIG. 4*b* is a curve showing the same signal converted into a divided signal by halving the mark element and inverting the second half;

FIGS. 5*a* and 5*b* are similar to FIGS. 4*a* and 4*b* respectively but for a space;

FIG. 6 shows curves of a succession of marks or a succession of spaces or a succession of mark and spaces converted in accordance with FIG. 4 or FIG. 5 or FIGS. 4 and 5. (Such a signal cannot result, after conversion, in more than two contigous half-elemnts on the same side of the zero axis, but results in the same number of half-element on each side of the zero axis.)

Figure 7A:
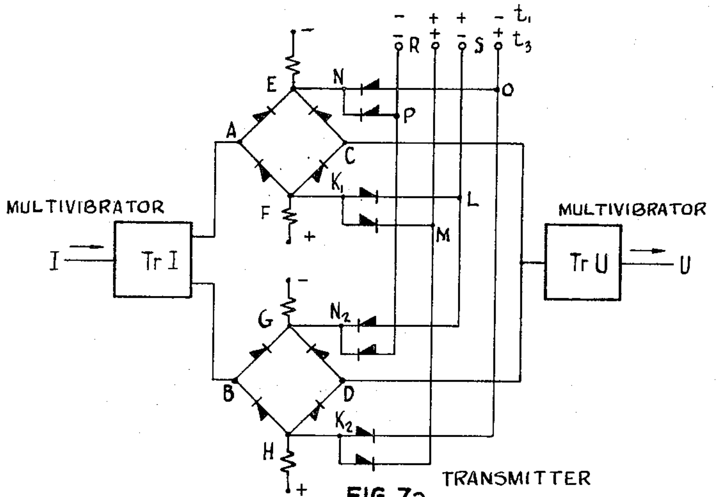
Figure 7B:
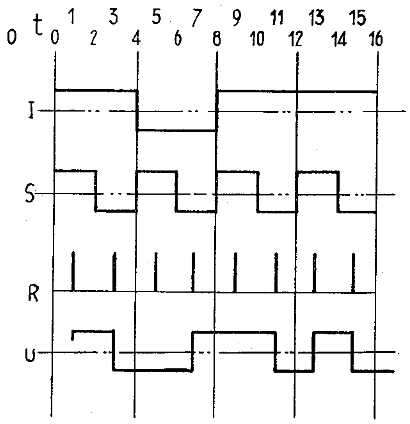
Figure 12:
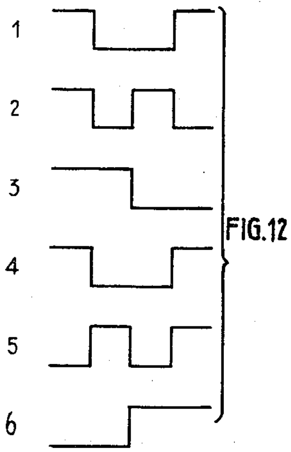
Figure 7:
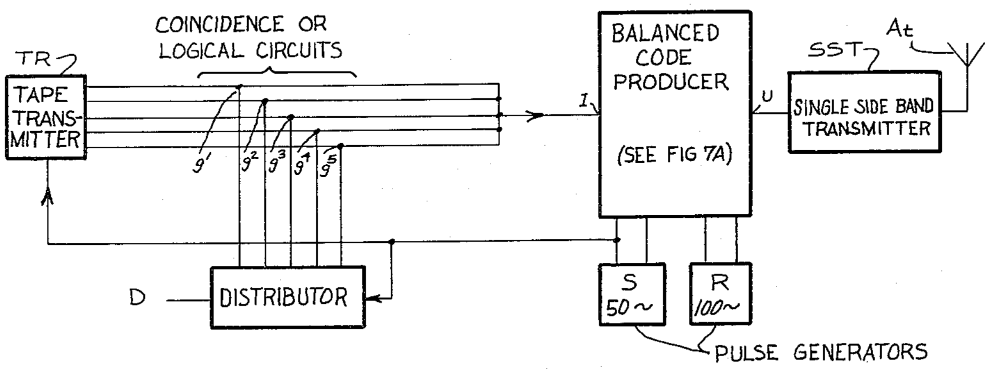
Figure 9:
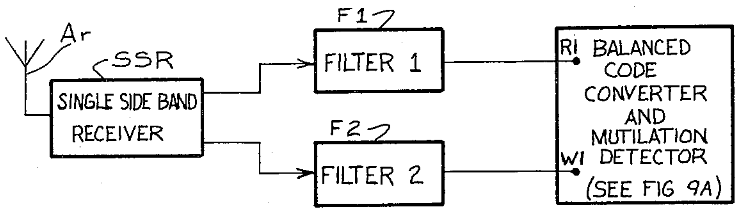
Figure 9A:
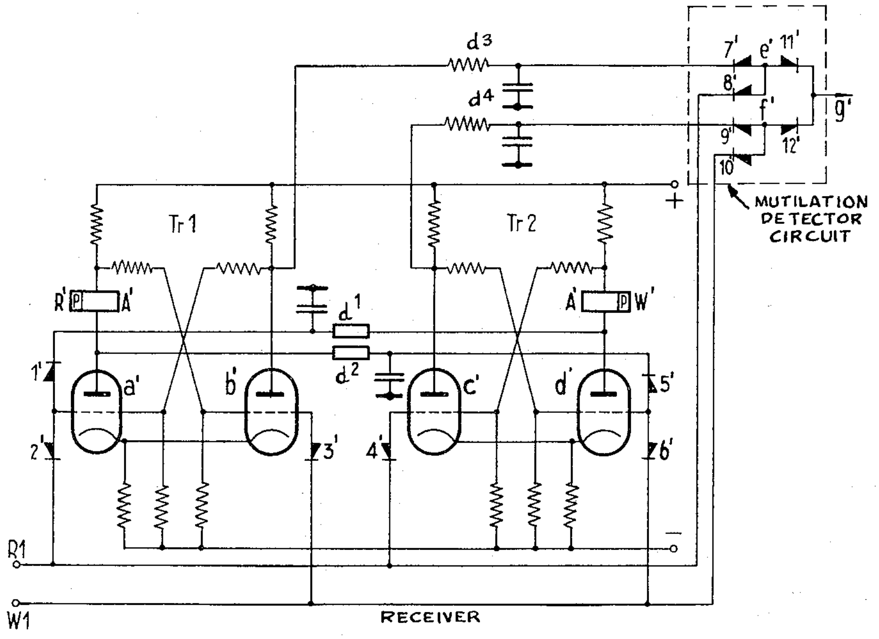
Figures 10, 11:
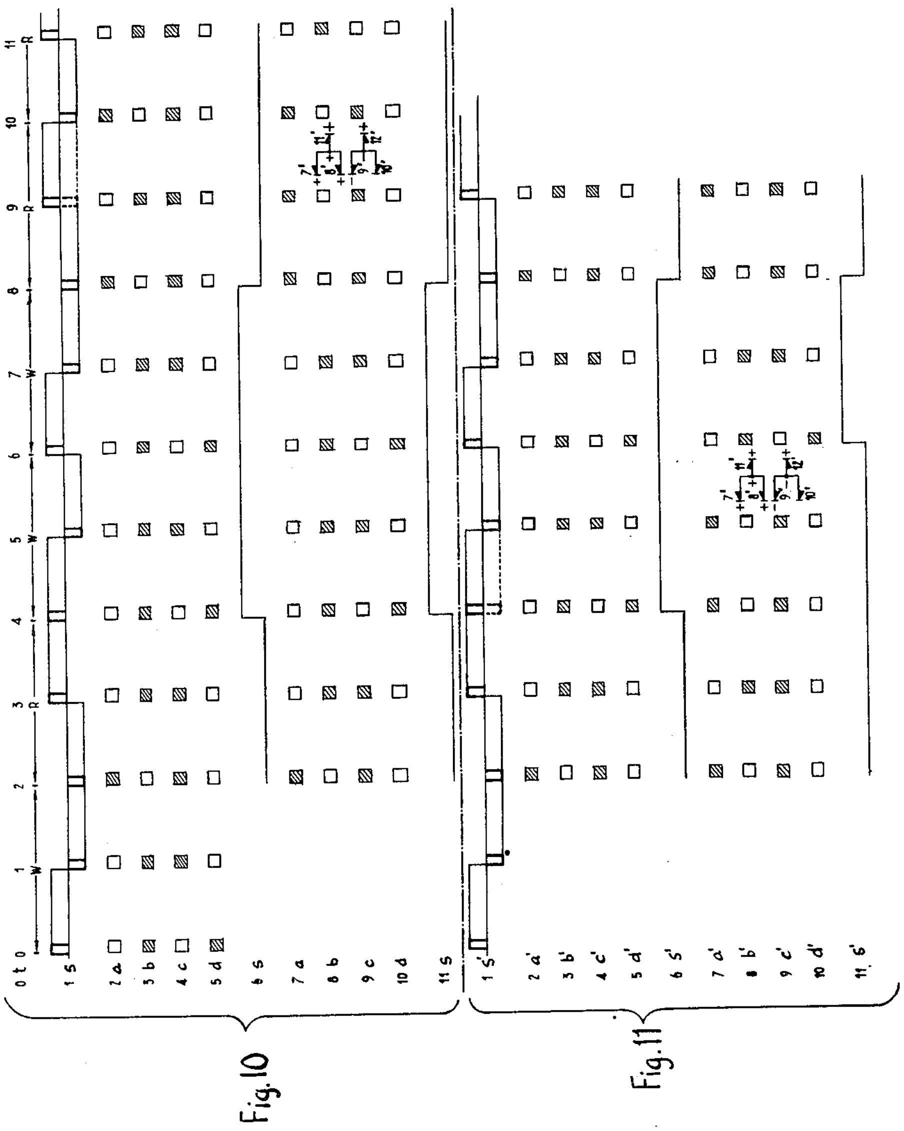

FIG. 7 is a schematic block diagram of a transmitter circuit for a five unit telegraph code signal arranged in accordance with one embodiment of this invention;

FIG. 7*a* is a schematic wiring diagram of the balanced code producing portion of the circuit shown in FIG. 7;

FIG. 7*b* is a time diagram of voltages occurring at different terminals in the balanced code producer circuit of FIG. 7*a*;

FIGS. 8*a* and 8*b* are schematic diagrams of the "and" gating or selector circuits shown in FIG. 7*a*;

FIG. 9 is a schematic block diagram of a receiver circuit according to one embodiment of the invention for the signals from a transmitter according to that shown in FIG. 7;

FIG. 9*a* is a schematic wiring diagram of the balanced code converter and multilation detector circuit shown in FIG. 9;

FIGS. 10 and 11 are similar schematic time diagrams, each illustrating the operation of the balanced code converter and multilation detector circuits of FIG. 9*a* for two kinds of multilated signals; and FIG. 12 comprises different wave-form diagrams relating to the operation of a receiver according to this invention.

*The signals*

In the further description of the invention, a balanced 8-units code will be assumed.

Figure 1:
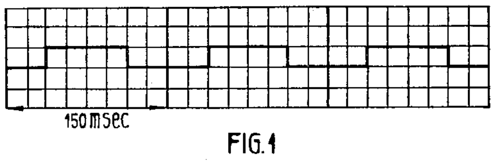
FIG. 1 is a graph of a wave-form of a balanced eight-elements signal.

In this case the lowest frequency will occur with a signal such as that shown in FIG. 1, consisting of two spacing elements four marking elements and two spacing elements.

If the duration of an eight unit-signal is taken to be 150 msec. (milliseconds) the basic frequency of this signal will be $$\frac{1000}{150}=6\tfrac{2}{3}\text{ c.s. (cycles per second)}$$

This is the lowest basic frequency occurring.

Figure 2:
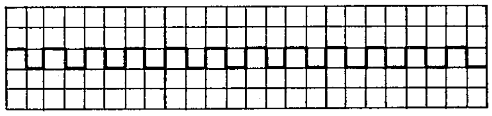
FIG. 2 is a graph of a wave-form of another balanced eight-elements signal.

The highest basic frequency occurring will arise from the signal shown in FIG. 2, consisting of eight elements comprising marking and spacing elements in alternation. The basic frequency is now: $4\times6\tfrac{2}{3}=26\tfrac{2}{3}$ c./s. Intermediate basic frequencies are constituted by arbitrary combinations of the existing signals.

The figures given above apply to the case of transmission via a single channel. If, however, a time-division principle is used, such as for example, in which the first 5 m./s. of a 20 m./s. signal corresponds to channel I, the second 5 m./s. of the same 20 m./s. corresponds to channel II, etc., then transmission of signals may be effected simultaneously over *n* channels, the lowest, the highest, and intermediate basic frequencies will be multiplied by a factor of *n*.

By way of example, in a 6-channel system the lowest basic frequency occurring will be $6\times6\tfrac{2}{3}$ c./s.=40 c./s., and the highest basic frequency will be $$6\times26\tfrac{2}{3}\text{ c./s.}=160\text{ c./s.}$$

Figure 3:
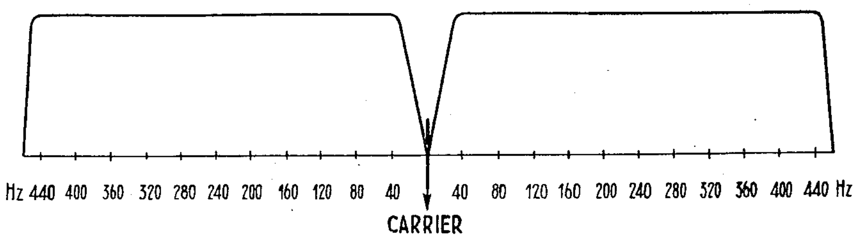
FIG. 3 is a graph of the frequency spectrum of a modulated carrier with the two side bands and suppressed carrier in a 6-channel system.

If the transmitter is given a band-width of e.g. 450 c./s. several higher harmonics of the basic frequencies can be transmitted as well. In this way we obtain a frequency spectrum as indicated in FIG. 3. The interval between the two side-bands for the lowest frequency amounts to $2\times40$ c./s.=80 c./s.

Under these conditions, it is easy to develop filters for suppressing one side-band without affecting the other, the desired, side-band. Therefore the system according to the invention permits the location of twice as many telegraph-channels in a given frequency band, as would be the case if both side-bands were used.

Furthermore, by the use of suitable modulators, the carrier may also be suppressed. (Detection of single side-band systems at the receiver-side can be effected by the superimposition upon the single side-band, of a local oscillation having the same frequency as that of the suppressed carrier, and then rectifying the resultant combination wave.) For synchronisation of the local oscillator at the receiver, the transmitter has to transmit a "pilot" wave. All the energy conveyed so far by the carrier and the two side-bands can now be concentrated on one side-band, which yields a gain of energy of 7 db. (decibels).

Single side-band suppressed carrier systems are well known in the telephone art, but so far have not been applied to telegraphy. The system according to the invention makes it possible to apply to telegraphy the single side-band suppressed carrier technique usual in telephony in order to profit by the advantages regarding the energy gain and the increase in the number of channels which can be accommodated in the frequency band.

Furthermore, in the system according to the invention, the transmitted signal has a substantially constant amplitude, because the direct current component is eliminated and after that the low-frequency-modulation has a practically constant amplitude and as a result the transmitted signal has a practically constant amplitude.

It is possible to apply the pure alternating current via two networks each effecting a 90° phase shift to a balanced modulator in order to obtain single side-band modulation.

Another way for realizing the invention consists in halving each element, as above mentioned. A marking element converted in this way is illustrated in FIG. 4, and a spacing element similarly converted is illustrated in FIG. 5. The resultant alternating current also gives a pure wave form. As can be seen from FIG. 6, the maximum number of halves resulting from halving and reversal of the second half, on the same side of the X-axis, both beneath the X-axis or both above the X-axis, is two, for unmutilated signals. Three successive concatinated or contiguous half elements on the same side of the zero or X-axis indicates that there has been a mutilation. This condition provides means whereby a faulty received signal can be recognized.

In order that telegraph signals can be transmitted by the so-called single side-band system according to the invention, it is necessary that the alternating current to be formed be a pure alternating current, i.e. that the area enclosed by the curve above the X-axis be equal to the area enclosed by the curve below the X-axis.

If each signal element is so transformed, that for each signal element, the said condition is met, that is, halving the element and reversing the second half, any arbitrary combination of signal elements constituting a complete signal may be used for transmission by the method of the invention and the result will always be as many half elements above as below the X-axis and never more in succession. A circuit will now be described, in which each signal element, which will be assumed to have a duration of 20 msec. (millisecond) (though its duration may be other than 20 msec.) is transmitted in the form of two half elements each of 10 msec., the first half being transmitted as of the same polarity as the undivided element itself and the second half being transmitted as of opposite polarity. Thus a mark element would be transmitted as a mark half-element immediately followed by a space half-element, and a space element would be transmitted as a space half-element immediately followed by a mark half-element. The thus transformed signal elements may be referred to as "divided" elements and the signals thus formed "divided" signals, the original signals being referred to as "undivided" signals.

The manner in which the object in view is secured by the method according to the invention will be described in connection with FIGS. 7, 7*a* and 7*b*.

*The transmitter*

Thus in the case when each signal element, of say for example a five-unit or element Baudot telegraph code signal, is transformed or converted into a balanced element signal, there is shown schematically in FIG. 7 a telegraph tape reader TR keyed by pulses from a pulse generator S, which generator also contols a distributor D that successively connects each element of each signal read by the reader TR through coincidence, logical or rectifier gate circuits *g*1 through *g*5 to the input I of the balanced code producing circuit of FIG. 7*a*. This balanced code producing circuit is also controlled by the pulse generator S. The balanced signal elements at output U of this balanced code producer are then connected to a single side band transmitter SST for modulation, such as frequency modulation on a radio carrier wave, and transmission from a transmitter antenna A*t*. This frequency modulation may comprise two selectable frequencies, one for marks or positive pulses and the other for spaces or negative pulses for easy detection by filters in a receiver.

In FIG. 7*a* the undivided signal arrives at terminal I, the divided signal formed goes out at terminal U. The squares designated by T*r*I and T*r*U represent triggers. These triggers are of the bi-stable multivibrator type, i.e. they have two stable states. At terminals R there is supplied a pulse-shaped voltage having a frequency of 100 c./s. as shown on line R in FIG. 7*b*. At terminals S there is applied a square wave voltage form having a frequency of 50 c./s. as indicated in line S of FIG. 7*b*.

If the potential at point F is positive with respect to the potential at point E (FIG. 7*a*), and currents flow from F to E via A and C, reducing the resistance to a minimum, so that in effect it can be said that the rectifier bridge ACEF is in a conductive condition so that the output potential from T*r*I at A will be reflected at C via the normal potential applied at E and F. If the potential at point E is positive with respect to the potential at point F, the rectifier bridge is biased to a non-conductive condition in the direction from A to C. A rectifier combination similar to the one connected between points A, E, C and F is connected between points B, G, D and H. The working of the two circuits is alike.

In order to better describe the function of these rectifier bridge networks ACEF and BDGH shown in FIG. 7*a*, each of the points E and F are respectively connected via a resistor to a negative and positive potential or battery terminal, and correspondingly each of the points G and F are similarly connected via a resistor to a negative and positive potential or battery terminal (see FIGS. 10–11 page 375 of "Waveforms" by Chance et al. of the M.I.T. Radiation Laboratories Series No. 19, published in 1949 by McGraw-Hill Book Co. Inc. of New York). Furthermore, each point E, F, G and H is connected via a rectifier to opposite poles of a 50 cycle selector voltage supply (see S in FIG. 7*b*) and via a second rectifier to opposite poles of a 100 cycle pulse selector voltage supply (see R in FIG. 7*b*). The operations of these rectifiers in the "and" circuits K1, K2, N1 and N2 are illustrated in FIG. 8*a* which shows that junction K1 (or K2) can become positive only if both points L and M (or M and O) are positive, and as soon as either or both of these points become negative, K1 (or K2) becomes negative also. Similarly, in the circuit according to FIG. 8*b*, junction N1 (or N2) can become negative only if both points O and P (or P and L) are negative, and as soon as either or both of these points become positive, points N1 (or N2) become positive too.

Figure 8:
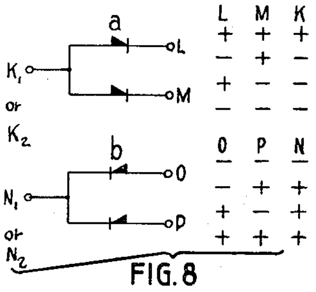

Now the outputs at the points C and D in the two rectifier bridges shown in FIG. 7*a* will be described in combination with the wave diagrams of FIG. 7*b* as controlled by opposite polarity inputs at the points A and B and by the alternating 50 cycle and 100 cycle voltage supplies S and R respectively through the "and" circuits K1, K2, N1 and N2, as also shown in FIG. 8.

At the time *t*1 shown in the chart of FIG. 7*b*, the pulses S and R are both positive, so that the right hand terminal of R in FIG. 7*a* is positive and the left terminal of R is negative at *t*1; and the left hand terminal S at *t*1 is positive and the right hand terminal of S is negative. Thus both points M and L are positive and junctions K1 and F are correspondingly positive, while at the same time points O and P are negative. Since the potential at point E is now more negative than that at point F, current flows from F to E through the rectifiers of the bridge ACEF via its parallel branches through points A and C, and the electronic switch of bridge ACEF is considered open or conductive for either positive or negative potentials or pulses applied to the point A. Under these conditions at this specific time *t*1, the positive potential applied to the point A from the upper output terminal of the input multivibrator Tr*I* will affect a positive potential at the point C to the input of the multivibrator Tr*U*. However, this positive potential must not be counteracted by an opposite potential at this time from the point D of the other electronic switch or rectifier bridge BDGH.

Correspondingly, at this same time *t*1, since M and O are positive and negative, respectively, K2 of the bridge circuit BDGH is negative; and since P and L are at this time *t*1 negative and positive, respectively, N2 is positive. Thus the normal negative potential applied to the point G is counteracted by the positive at N2 and correspondingly the normal positive potential at the point H is counteracted by the negative potential at the point K2, so that the point G becomes more positive than the point H and no current at all flows through the rectifier bridge or electronic switch BDGH from H to G, and accordingly it is considered close or non-conductive for either positive or negative potentials or pulses applied to the point B. As a result of this, no potential can be applied to the point D to effect the input of the multivibrator circuit Tr*U* so that the positive potential at this time applied from the point C controls this output multivibrator circuit Tr*U*, as can be seen in comparing the wave forms I and U at the point *t*1 in FIG. 7*b*; namely, that at this instant the wave form U becomes positive when wave form I from the upper terminal of the input multivibrator Tr*I* is also positive.

Now at the time *t*3, when the positive potential and wave form U changes to negative as shown in FIG. 7*b*, the pulse S is negative and the pulse R is positive, so that the right hand terminals R and S in FIG. 7*a* are positive and the left hand terminals are negative, as shown in the line corresponding to time *t*3 above these terminals in FIG. 7*a*. Under these conditions O and P become positive and negative, respectively, so that junction N1 becomes positive counteracting the normal negative potential applied to the point E; and correspondingly points L and M become negative and positive, respectively, so that junction K1 becomes negative and counteracts the normal positive potential applied to the point F. Thus, point E becomes more positive than the point F and no current flows through the rectifier bridge or electronic switch ACEF from point F to point E, and this switch is closed or becomes non-conductive so no potential from point A can be applied to the point C, even though a positive potential is still applied to the point A as shown at time *t*3 in the diagram of FIG. 7*b*. Accordingly this gate, electronic switch or bridge circuit ACEF has no effect upon the input of the output multivibrator Tr*U* by potential from the point C at this time *t*3.

However, at this same time *t*3 the other gate, electronic switch or rectifier bridge circuit or electronic switch BDGH is open or conductive, in that points P and L are both negative making the junctions N2 and G negative, while the points M and O are both positive making the junctions K2 and H positive, so that current flows from point H to point G through the parallel circuits of points B and D, making this gating circuit open or conductive so that either a positive or negative potential or pulse applied to the point B from the lower terminal of the input multivibrator Tr*I* will correspondingly affect the point D and apply it to the input of the output multivibrator Tr*U*. Thus, since a negative potential is now applied to the point B, the point D becomes negative at the time *t*3 as shown on wave form U of FIG. 7*b*.

Similarly at the other times the circuit of FIG. 7*a* will reconstruct the wave form U from the wave form I in combination with the potentials applied by the two additional 50 and 100 cycle voltages S and R, respectively.

The circuit according to FIG. 7*a* is so arranged that the rectifier combination ACEF is always conductive during the positive half of the cycle of the 50 c./s. voltage (the rectifier combination BDGH being non-conductive), whereas during the negative half of the cycle the rectifier combination BDGH is conductive (the rectifier combination ACEF being non-conductive). If a start polarity element arrives at I, point A will become positive with respect to point B, if a stop polarity element arrives at I, point B will become positive with respect to point A.

Consider, first, the case of a start polarity element. Such an element renders point A positive with respect to point B. For the first 10 msec. the rectifier combination ACEF is conductive, so that the positive potential of A together with the potentials of R and S controls via C the outgoing trigger Tr*U*. For the next 10 msec. the rectifier combination ACEF is non-conductive and combination BDGH is conductive; the negative potential of B together with the potentials of R and S controls via D the outgoing trigger Tr*U* thus the undivided start polarity element is received in the outgoing trigger Tr*U* as a start polarity divided element for the first 10 msec. and as a stop polarity divided element for the next 10 msec. (see FIG. 4*b*).

Consider, now, the case of an undivided stop polarity element. Such an element renders point B positive and A negative. For the first 10 msec. the rectifier combination ACEF is conductive again, so that the negative potential at A together with the potentials of R and S controls via C the outgoing trigger Tr*U*. For the next 10 msec. the rectifier combination BDGH is conductive, so that the positive potential of B together with the potentials of R and S controls via D the outgoing trigger Tr*U*. Thus the undivided stop polarity element is received in the outgoing trigger Tr*U* as a divided stop polarity element for the first 10 msec. and as a divided start polarity element for the next 10 msec. (see FIG. 5*b*).

Consider now the incoming signal indicated on line I of FIG. 7*b* consisting, successively, of an undivided start polarity element, an undivided stop polarity element and two undivided start polarity elements. At the moment *t*1 the positive pulse (line R) of the 100 c./s. voltage and the positive half-cycle (line S) of the 50 c./s. voltage together render point F in FIG. 7*a* positive (point E becoming negative). The reason for this is that at the moment *t*1 the positive pulse (line R FIG. 7*b*) of the 100 cycles per second voltage occurs in R FIG. 7*a*, the right-hand terminal of R is rendered positive and the left-hand terminal of R is rendered negative. Also when the positive half-cycle (line S FIG. 7*b*) of the 50 cycles per second voltage occurs in S FIG. 7*a*, the left-hand terminal of S is rendered positive and the right-hand terminal of S is rendered negative. As a result of this, the right-hand side of the rectifier cells connected with point F (FIG. 7*a*) are both positive and then F becomes positive (FIG. 8*a* case 1). As a further result the right-hand side of the rectifier cells connected with point E (FIG. 7*a*) are both negative and then E becomes negative (FIG. 8*b* case 1). Under these conditions, rectifier network ACEF is, as has been shown above, biased to the conductive condition and at this moment the outgoing trigger receives a divided start polarity (line U, FIG. 7*b*). At time $t3$, the next positive pulse (line R) of the 100 c./s. voltage and the second half cycle of the 50 c./s. voltage make point H positive and the rectifier combination BDGH will be conductive and at this moment the outgoing trigger receives a divided stop polarity (see line U, FIG. 7*b*).

At the moment $t5$ point F again becomes positive. At this moment the incoming stop polarity element is passed on for 10 msec. as a stop polarity divided element via the rectifier combination, etc. Continuing in this manner the incoming undivided signal (line I, FIG. 7*b*) is transformed into the outgoing divided signal (line U, FIG. 7*b*).

*The receiver*

A circuit for transforming undivided signals into divided signals is well known; this known circuit was built up entirely from relays.

The transformation according to the present invention offers a quite new solution for this problem.

The invention also provides a receiver which not only restores the divided signal into an undivided signal, but which also records mutilations of signals. Demodulation by comparing the divided signal with a similar 50 c./s. voltage to that used for effecting the modulation is not possible, as will be seen from FIG. 12. On line 1 in this figure an undivided signal is shown, consisting of a start polarity element followed by a stop polarity element. The 50 c./s. voltage is shown on line 2. Line 3 shows the demodulated undivided signal. Line 4 shows the same divided signal as the one shown in line 1. Line 5 shows again the 50 c./s. voltage, but in reversed phase with respect to this voltage as shown on line 2. As is seen from the undivided signal (line 6) the result will be that the signal comes out reversed (cf. . . . lines 6 and 3). From the above it is seen that demodulation cannot be effected in the way described.

A block circuit diagram for a receiver is shown in FIG. 9 wherein the received modulated balanced radio signals from antenna A*t* in FIG. 7 are received on receiver antenna A*r* in FIG. 9, demodulated in a single side band receiver SSR, and the demodulated signals are connected to two filters; namely, filter F1 which passes the space frequency of each signal element, and filter F2 which passes the mark frequency of the signal element. The outputs of these filters are connected to the input terminals R1 and W1, respectively, of the balanced signal element converter circuit which is shown in more detail in FIG. 9*a* together with a mutilation detector circuit as will be described in detail below. FIGS. 10 and 11 illustrate how the transformation of the divided signal into the undivided signal is effected in the circuit of FIG. 9*a*. Moreover, a different mutilation has been introduced into each of these figures, and the way in which this mutilation is recorded for use is described.

As shown in FIG. 9*a* the receiver contains, among other things, two trigger circuits (or bi-stable multivibrators).

One trigger T*r*1 has two tubes *a'* and *b'*, the other trigger T*r*2 has two tubes *c'* and *d'*. A' is a receiving relay, which is a polarized relay; one winding R' of this relay is included in the anode circuit of tube *a'*, the other one W' is included in the anode circuit of tube *d'*.

The anode of tube *d'* is connected via an RC-combination (resistor-condenser) or time delay circuit *d*1 and a rectifier 1' to the grid of tube *a'* and the anode of tube *a'* is connected via a similar RC-combination or time delay circuit *d*2 and rectifier 5' to the grid of tube *d'*.

The said RC-combinations *d*1 and *d*2 effect a certain delay in the transfer of the voltage variations at the anode of one tube to the grid of the other.

This delay is longer than the duration of the incoming pulse and shorter than 10 msec. The anodes of tubes *b'* and *c'* are connected via delaying RC-circuits and *d*3 and *d*4 and rectifiers 7', 11' and 9', 12', respectively, to point *g'*; from where a disturbance indicator is controlled.

The pulse-shaped divided signal comes in at points R1 and W1. The undivided signal is repeated by the polarised relay A' having the separate windings R' and W' shown in FIG. 9*a*. An incoming divided start signal, consisting first of a start mark, or positive polarity and then of a stop, space, or negative polarity, each of 10 msec., first makes point W1 and then point R1 positive for 10 msec. each. Such a signal is received by polarised relay A' as a start polarity element. An incoming divided stop signal, consisting first of a stop or negative polarity and then of a start or positive polarity, each of 10 msec., first makes point R1 and then point W1 positive for 10 msec. each. Such a signal is received by the polarised relay A' as a stop polarity element. Points R1 and W1 are connected via rectifiers 8' and 10', respectively to point *g*, from where a disturbance indicator, such as that shown in Van Duuren Swiss Patent No. 298,341, is controlled. When tube *a'* is conductive, winding R' will be energised and the receiving relay will assume the stop polarity condition.

When tube *d'* is conductive, winding W' will be energised and the receiving relay will assume the start polarity condition.

In the beginning of the reception the receiver must be put in phase with the incoming signal with a view to a correct sampling of this signal. The circuit arrangement itself provides the solution (see also FIG. 10).

On line 1*s* (FIG. 10) the time division is given. Line 1*s*, gives a pulse-shaped transformation of the incoming divided signal. Line 2 gives the conditions taken by tube *a'* (FIG. 9*a*); a striped square indicates that the relevant tube is in the conductive condition and an empty square indicates that the relevant tube is in the non-conductive condition. Lines 3*b*, 4*c* and 5*d* show the successive conditions of tubes *b'*, *c'* and *d'*, respectively, at the moments indicated on line 0. Supposing tubes *b'* and *d'* are conductive at the beginning of the reception ($t=0$), the anodes of *b'* and *d'* will have low potentials, whereas the anodes of tubes *a'* and *c'* will have high potentials. Relay A' will be in the start polarity condition. An arriving voltage of stop polarity (at moment $t1$) will cause a positive voltage on R1. This positive voltage tends to render tube *a'* as well as tube *c'* conductive. With tube *c'* this succeeds without difficulty, but it will not succeed with tube *a'*, because the grid of tube *a'* has via rectifier 1' the low potential of the anode of tube *d'*. (Remember: tube *d* was assumed to be conductive.)

In order that the grid of tube *a'* may be given a high potential via rectifier 2', a high potential must be applied to that terminal of rectifier 1' that is not connected with the grid (cf. FIG. 8*a*). Thus only in trigger T*r*2 the tubes change conditions (see for the various tubes the squares immediately after moment $t1$). As tube *d'* becomes non-conductive the grid of tube *a'* will receive with some delay a high potential.

A succeeding voltage impulse of stop polarity (at moment $t2$) can reverse trigger T*r*1. At this moment relay A' assumes the stop polarity condition. Further voltages of stop polarity arriving cannot change the condition of the triggers T*r*1 and T*r*2.

In the same way, if after a delay of 10 msec., there arrives a voltage of start polarity, at first trigger T*r*1 and next trigger T*r*2 will pass to the other condition, so that relay A' assumes the start polarity condition. This is a final condition again; the next voltage of start polarity has no effect, because tube *b'* as well as tube *d'* are conductive already.

This enables the receiver to get in phase. Immediately after the first reception of two impulses of stop polarity or of two impulses of start polarity, the scanning occurs at the correct moments with respect to the incoming (divided) signal. In FIG. 10 this is the case immediately after $t2$.

FIG. 10 shows further which conditions the tubes assume successively (2*a*, 3*b*, 4*c* and 5*d*) on arrival of a message consisting of divided signals as indicated on line 1s.

It can be seen from this that immediately after t2 tube a′ is conductive, i.e. winding R′ of relay A′ is energised and the relay passes to the stop polarity condition (see line 6s).

*Mutilations*

At the moment t4 tube d′ becomes conductive; winding W′ of relay A′ is energized and the relay passes to the start polarity condition. Thus line 6s, derived from the conditions of the tubes according to lines 2a, 3b, 4c and 5d shows the undivided signal as it is recorded by relay A′. From line 1s it can be seen what happens if a mutilated signal is received; a mutilation has been introduced at moment t9 between t8 and t10, where a divided element, which should be of stop polarity, (see dashed line), appears as of start polarity. It can be derived from the above explanations that tubes a′, b′, c′ and d′ successively assume conditions as indicated on lines 7a, 8b, 9c and 10d. Derived from this line 11s shows the undivided signal. In this undivided signal the mutilation indicated has no effect (FIG. 11 deals with a mutilation that does have effect).

Yet the mutilation is signalled to the disturbance indicator. In order to illustrate this the rectifiers, the accompanying numbers of which correspond with the numbers placed against these rectifiers in FIG. 9a, are shown under t9 and t10 in lines 8b and 9c. Rectifier 7′ assumes with the delay mentioned the polarity of the anode of tube b′. Consequently, this polarity is high (positive), because tube b′ become non-conductive at moment t8, which resulted in a potential rise on the anode; after the said delay rectifier 7′ equally assumes this potential.

If then after t9 an impulse of stop polarity arrives (as a result of a mutilation), this will result in a positive voltage on terminal R1, and rectifier 8′ (which is connected to R1) will have a high potential as well, point e′ (FIG. 9a) will have a high potential and also point g′ in FIG. 9a will have a high potential via rectifier 11′; the disturbance indicator receives a positive voltage impulse, which means that a disturbance is recorded. It has already been explained in connection with FIG. 8 how rectifiers, such as 7′ and 8′ of FIG. 9a, respond to positive potentials, will produce a positive potential.

Subsequently, a disturbance indicator conned to g′ effects by well-known means the transmission of a request for repetition.

As long as the reception is good, point g′ will not receive a positive impulse; this is effected by the connection of the rectifiers 7′ to 12′.

For further explanation FIG. 11 shows how another form of mutilation (see dashed line between t4 and t5) is signalled via point g′ to the disturbance indicator. Line 0 gives the time division. Line 1s′ shows an incoming message consisting of divided signal transformed into pulse patterns. The order of sequence of the signals is the same as has been indicated on line 1s′ of FIG. 10. Lines 2a′, 3b′, 4c′ and 5d′ show, respectively, the conditions of tubes a′, b′, c′ and d′ in the case of signals arriving non-mutilated. After the foregoing explanations these lines are self-evident. Line 6s′ shows the derived (undivided) signal (see also line 6s′ in FIG. 10). Lines 7a′, 8b′, 9c′ and 10d′ show which conditions tubes a′, b′, c′ and d′ assume if the incoming signal is mutilated as illustrated by the dashed line between t4 and t5.

Derived from this line 11s′ shows the undivided signal as it was recorded by relay A′.

A comparison of line 11s′ with line 6s′ shows that the signal would be recorded wrong if the disturbance indicator did not operate. That it does operate will become clear if one considers the polarities of the combination of rectifiers 7′ to 12′. At the moment t4 tube b′ (line 8b′) has become non-conductive, as a result of which the anode potential has risen.

This potential rise is taken over by rectifier 7′ after the above-mentioned delay. At moment t5 a voltage of stop polarity arrives i.e. a positive voltage at R1; therefore rectifier 8′, and consequently point e′ (FIG. 9a), as well as point g′ (FIG. 9) will have a high potential, and the disturbance indicator receives via point g′ a positive impulse, i.e. a fault indication, and a repetition is requested in the well-known way.

While I have illustrated and described what I regard to be the preferred embodiment of my invention, nevertheless it will be understood that such is merely exemplary and that numerous modifications and rearrangements may be made therein without departing from the essence of the invention, I claim:

1. A telecommunication system for multi-element start-stop code signals comprising: means for converting each element of each signal to form a balanced signal, means connected to said converting means for modulating said balanced signal on a carrier frequency wave, means connected to said modulating means for transmitting a single side band of said carrier wave, means for receiving and demodulating said modulated signal on said single side band carrier wave, means connected to said receiving and demodulating means for reconverting said balanced signal into its original start-stop code signal, and means connected to said reconverting means for detecting multilation in any element of said received and demodulated signal.

2. A system according to claim 1 wherein said transmitting means includes means for suppressing the carrier frequency current in at least one of said side bands.

3. A system according to claim 1 wherein said balanced signal comprises the same number of positive polarity elements as negative polarity elements.

4. A system for claim 1 wherein said converting means comprises means for dividing each element of each signal in two, the first half of each element having the same polarity as that of the element being converted and the second half of each element having an opposite polarity from that of said element being converted.

5. A system according to claim 4 wherein said dividing means comprises input and output circuits connected by a pair of rectifier network and "and" circuits.

6. A system according to claim 4 wherein said reconverting means includes means for reuniting the divided halves of each signal element.

7. A system according to claim 6 wherein said reuniting means comprises a pair of trigger circuits, means for interconnecting an output of each trigger circuit through a delay circuit, and a relay having two windings one of which is connected to the output of each trigger circuit.

8. A system according to claim 7 wherein said detecting means comprises a plurality of "and" circuits, and means for connecting said "and" circuits to said trigger circuits and to the input of said reuniting means.

9. A system according to claim 1 wherein said detecting means comprises means for scanning, testing and indicating mutilation of each element of each signal.

10. A system according to claim 1 wherein said detecting means includes means for automatically effecting the initial phase synchronization of said reconverting circuits by reception of the first pair of similar elements of a signal to be reconverted.

11. A transmitter system for a multi-element start-stop code signal comprising: means for converting each element of each signal to form a symmetrical wave form, means connected to said converting means for modulating said symmetrical wave form on a carrier frequency wave, and means connected to said modulating means for transmitting a single side band of said carrier frequency wave, said converting means comprising: a pair of trigger circuits, a pair of rectifier networks connected between said circuits, a pair of "and" circuits connected to each of said networks, and a pair of frequency voltage sources applied to each of said "and" circuits, one of said frequency voltages having twice the frequency of the other, said other frequency voltage having twice the frequency of that of the elements in said signal, whereby each element of each signal is divided into two halves, the first half having the same polarity as that of the original element and the second half having an opposite polarity thereto.

12. A telecommunication system for multi-element start-stop code signals, comprising: means for converting each element of each signal to form a balanced signal, means connected to said converting means for modulating said balanced signal on a carrier frequency wave, means connected to said modulating means for transmitting a single side band in said carrier frequency wave, means for receiving and demodulating said modulated signal on said single side band carrier wave, means connected to said receiving and demodulating means for reconverting said balanced signal into its original start-stop code signal, and means connected to said reconverting means for detecting mutilation in any element of said received and demodulated signal whereby a request for repetition may be made when a mutilation is detected, said reconverting means comprising: a pair of trigger circuits each having two electron tubes, means for interconnecting the outputs and the inputs of two of said tubes, one from each trigger circuit, through separate delay circuits, and a relay having two windings and being responsive to reproduce said original start-stop code signal, separate windings of said relay being connected to each said output of said two tubes of said trigger circuits.

13. A system according to claim 12 wherein said detecting means includes a plurality of "and" circuits connected through additional separate delay circuits between the inputs and outputs of the other two tubes, one from each said trigger circuit.

14. A telecommunication system for multi-element start-stop code signals comprising: means for converting each element of each signal to form a balanced signal, means connected to said converting means for modulating said balanced signal on a carrier frequency wave, means connected to said modulating means for transmitting a single side band of said carrier frequency wave, means for receiving and demodulating said modulated signal on said single side band carrier wave, means connected to said receiving and demodulating means for reconverting said balanced signal into its original start-stop code, and means connected to said reconverting means for detecting mutilation in any element of said received and demodulated signal, whereby a request for repetition may be made when a mutilation is detected, said detecting means comprising two "and" circuits connected by delay circuits to the outputs and inputs of said reconverting means, and a third "and" circuit said two "and" circuits together.

15. A converter for converting a balanced multi-element code signal into a signal of half the number of elements of said balanced signal, said converter comprising: a pair of trigger circuits, two electron tubes in each trigger circuit, input conductors of opposite polarity for said circuits, means for connecting the input of one tube of each trigger circuit to one of said input conductors and the input of the other tube of each trigger circuit to the other polarity input conductor, means for connecting the output of said one tube of one circuit through a delay device to the input of said other tube of the other circuit, means for connecting the output of said other tube of said other circuit through a second delay device to the input of said one tube of the one circuit, a relay having two windings, the output of which relay produces the signal with half the number of elements as said balanced signal, means for separately connecting said windings to each of said outputs of said one and said other tubes, and means connected to said trigger circuits for detecting mutilation in any element of said balanced signal being converted in said converter.

16. A system according to claim 15 wherein said detecting means includes a pair of "and" circuits each connected to a separate one of said input conductors, and each connected to the output of the other tube of said one trigger circuit and the one tube of said other trigger circuit, and a third "and" circuit connecting said two "and" circuits together, the output of said third "and" circuit indicating said mutilation whereby a request for repetition of said balanced signal may be made.

17. A system according to claim 16 including additional delay devices in the connections between said two "and" circuits and said outputs of said tubes of said trigger circuits.

References Cited in the file of this patent

UNITED STATES PATENTS

| | | |
|---|---|---|
| 1,827,860 | Thorp | Oct. 20, 1931 |
| 2,700,149 | Stone | Jan. 18, 1955 |
| 2,729,809 | Hester | Jan. 3, 1956 |
| 2,815,498 | Steel | Dec. 3, 1957 |

OTHER REFERENCES

Publication: "Electronic and Radio Engineering" by F. E. Terman; 4th edition, published 1955 by McGraw-Hill Book Co.; pages 539–544; Library of Congress Card Catalog Number 55–6174.